June 29, 1965 R. C. PARKES ETAL 3,191,757
ENDLESS-TYPE CONVEYOR
Filed July 16, 1962 3 Sheets-Sheet 2

INVENTORS.
RALPH C. PARKES
FREDERICK C. HOEFLE
BY
ATTORNEY.

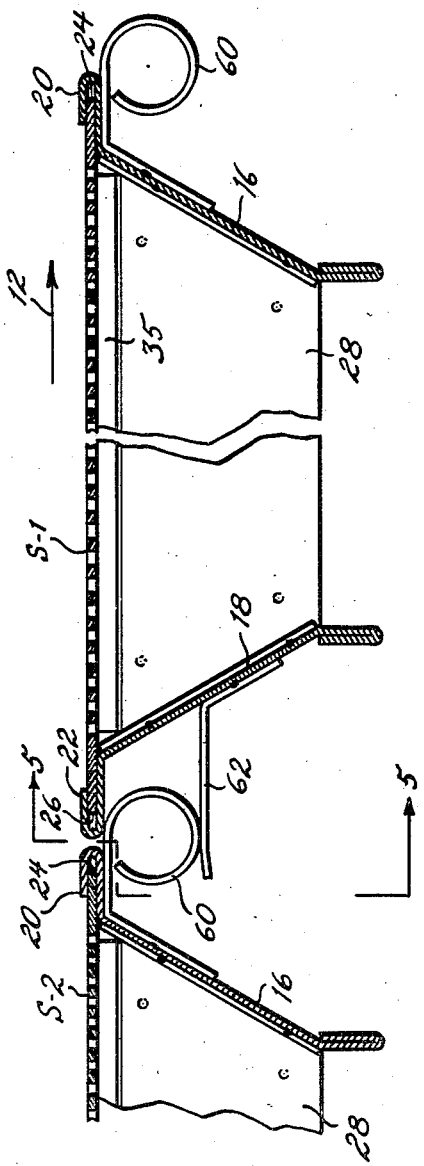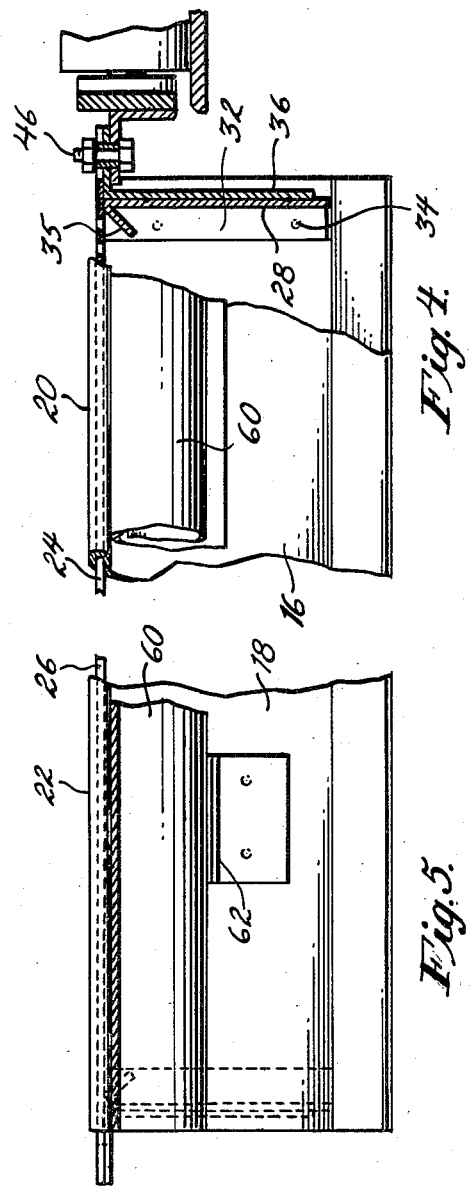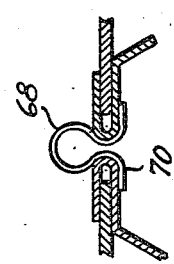

United States Patent Office 3,191,757
Patented June 29, 1965

3,191,757
ENDLESS-TYPE CONVEYOR
Ralph C. Parkes, Rydall, and Frederick C. Hoefle, Philadelphia, Pa., assignors to The National Drying Machinery Company, Philadelphia, Pa., a corporation of Pennsylvania
Filed July 16, 1962, Ser. No. 209,892
5 Claims. (Cl. 198—129)

This invention relates to a conveyor for use in a drying chamber, or for other applications in which a conveyor is subjected to substantial heat fluctuations.

A conveyor of the type deferred to is made of articulated parts which, for proper operation, must be fairly precisely made and assembled and, frequently, if not always, said parts are made of different thicknesses and weights and/or of metals having different coefficients of expansion. When a conveyor of this type is subjected to sufficient heat, its various parts expand unevenly with undesirable friction and/or binding.

The object of this invention is to produce an improved structure whereby a conveyor of the type referred to will operate satisfactorily and without friction or binding, even when subjected to heat sufficient to cause maximum expansion of the parts of the conveyor.

A further object is to produce an improved structure whereby an endless conveyor is properly articulated so as to bend to the radius of the sprocket wheels driving and supporting the conveyor.

The full nature of the invention will be disclosed in the following specification and the accompanying drawings in which:

FIG. 3 is a vertical sectional view looking in the direction of line 3—3 on FIG. 1.

FIG. 4 is a vertical sectional view looking in the direction of line 4—4 on FIG. 1.

FIG. 5 is a vertical sectional view looking in the direction of line 5—5 on FIG. 3.

FIG. 7 is a fragmentary sectional view showing another mode of connecting the conveyor sections.

Figure 1:
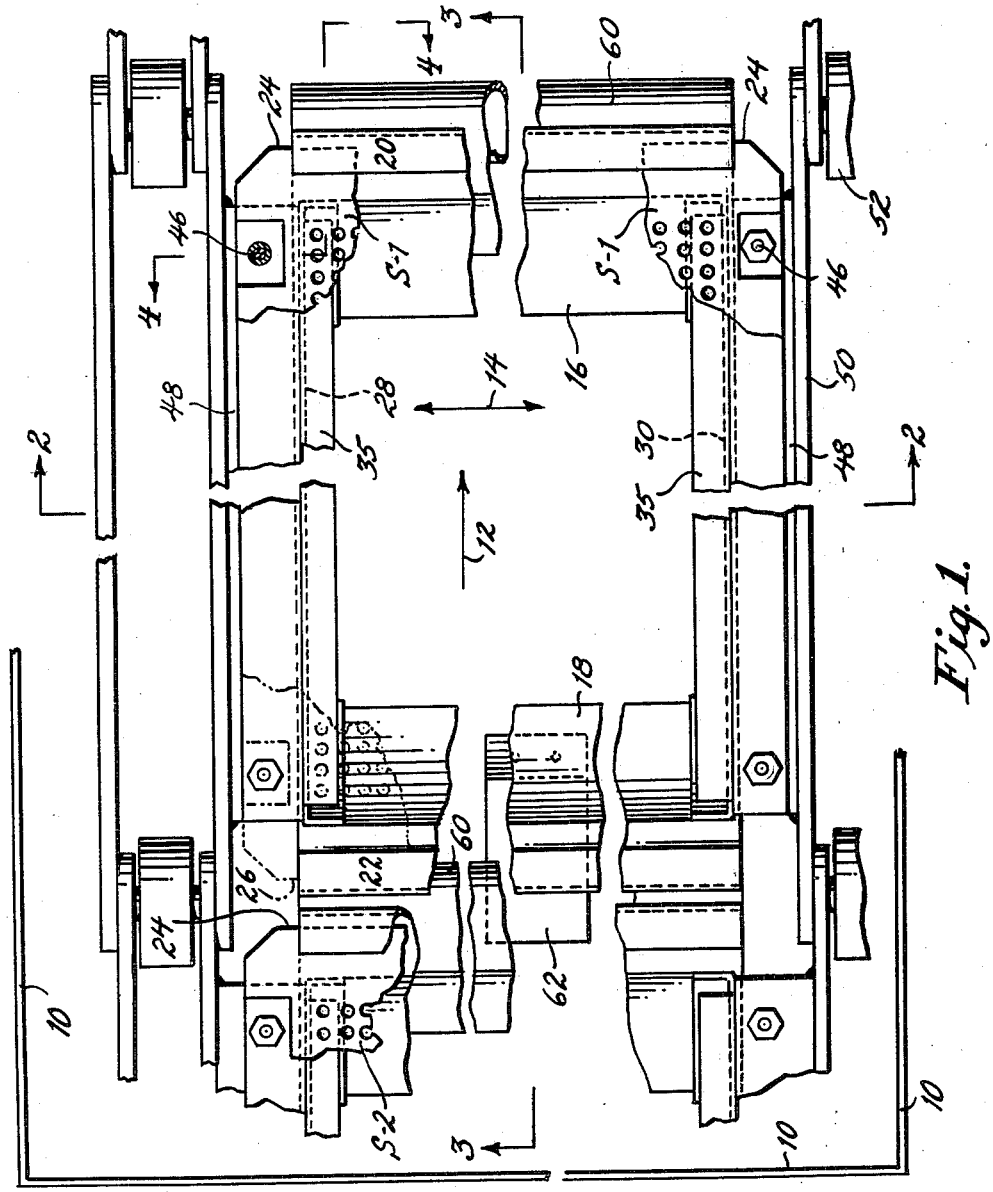
FIG. 1 is a top plan view of a conveyor embodying the invention, certain parts being broken away to show details of construction.
Figure 2:
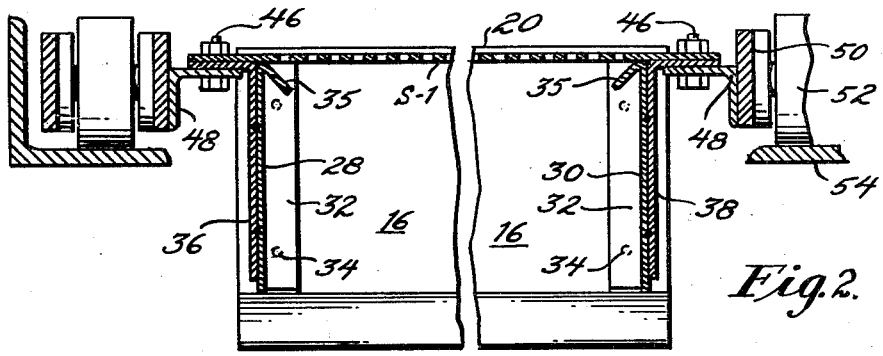
FIG. 2 is a vertical sectional view looking in the direction of line 2—2 on FIG. 1.

In the drawings, 10 designates a portion of a drying chamber, or other enclosure, through which the conveyor moves as, for example, in the direction of arrow 12 in FIGS. 1 and 3. The chamber is supplied with a heated medium, such as air or steam, for drying, or otherwise processing a material placed on the conveyor. The medium is delivered by any conventional means, such as blowers and nozzles, etc. Since the manner in which the interior of the chamber is heated forms no part of this invention, it is not shown nor described. For the purpose of the present disclosure, it is sufficient to say that the conveyor, the parts propelling it and the parts supporting it are all subjected to heat sufficient to produce appreciable expansion which, without the benefit of the present invention, would develop undesirable friction or total binding.

While the invention is applicable to all conveyors, it is herein described as applied to an endless conveyor.

According to the present invention, the endless conveyor is made in sections and the sections are assembled in a manner to produce a sufficiently continuous surface while permitting ample expansion and are articulated to allow the conveyor to bend to the radius of the sprockets which drive the conveyor and support the upper run thereof.

As illustrated, the conveyor is made of a number of sections, only two sections, S–1 and S–2, of which are shown. The length of each section, measured from right to left, as viewed in FIG. 3, is such as to permit the endless conveyor to flex around the driving and supporting sprockets, not shown. The width of each section, measured in the direction of arrow 14 in FIG. 1 is not critical. The conveyor may be made of a chain cloth, or of imperforate sheets or of slats, etc., depending on the nature of the material to be supported by the conveyor while being dried or otherwise processed.

In the present disclosure, the conveyor is formed of perforated, relatively thin sheets of metal and each conveyor section S–1, S–2, etc., is supported by a box-like framework which is individually secured to and carried by the propelling socket chain without being secured to the leading and trailing sections of the conveyor.

Figure 6:
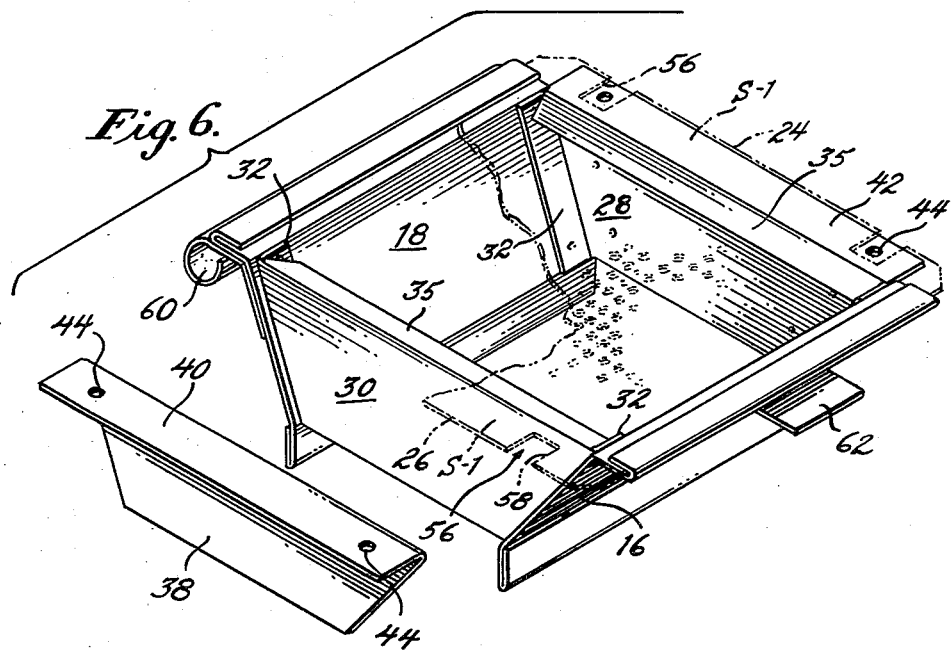
FIG. 6 is a fragmentary, exploded perspective view showing details of construction.

As best shown in FIG. 6, each box-like structure includes front and rear, or leading and trailing, downwardly converging walls 16 and 18, the upper ends of which are bent upon themselves to form oppositely facing U-shaped members 20 and 22 which loosely receive the leading and trailing edges 24 and 26 of each conveyor section S–1, S–2, etc., as best shown in FIG. 3. Leading and trailing walls 16 and 18 are connected by side walls 28 and 30, which also slant downwardly, and are provided with side flanges 32 which are secured to the leading and trailing walls, as at 34. The upper edges of side walls 28 and 30 are bent down, as at 35, for reinforcement purposes. This arrangement produces a rigid box-like structure for supporting the conveyor section thereabove. In order to support the conveyor in a loose manner which permits expansion and contraction in all directions, side walls 28 and 30 have secured thereto auxiliary outer walls 36 and 38, the upper margins of which are bent outwardly to form horizontal flanges 40 and 42 which are provided with holes 44 for receiving bolts 46 for securing the flanges 40 and 42 to angles or brackets 48 which are secured to sprocket chains 50. Sprocket chains 50 carry wheels 52 which ride on track 54 which are carried by, or form part of, the frame of the chamber.

The marginal portions of the conveyor sections S–1 and S–2 are notched out, as at 56, movably to receive the upper ends of bolts 46, as best seen in FIGS. 1 and 4. By this arrangement, bolts 46 serve to pull the conveyor section by engaging the leading edges 58 of the notches. In this way, the conveyor sections are pulled by the sprocket chains and since the leading and trailing edges 24 and 26 of each conveyor section are engaged in U-shaped members 20 and 22, each conveyor section is adequately positioned and pulled without being rigidly confined.

In one embodiment, one wall, such as the leading wall 16 of each conveyor frame, carries an arcuate member, or loop 60, and the opposite, or trailing wall carries a supporting bracket 62. This is best illustrated in FIG. 3, from which it will be seen that the arcuate member 60 of a trailing conveyor frame will, when the sections are attached to the sprocket chain, rest on the supporting bracket of a leading frame. It will be noted that the space between adjacent U-shaped members 22 and 20 of adjacent conveyor frame is closed by the horizontal portion 63 which secures the arcuate member 60 to the wall 16 of the assembly.

By this arrangement, loop 60 is free to move relative to supporting bracket 62 in response to expansion and contraction and conveyor sections S–1 or S–2 and is free to move when the conveyor travels over the sprocket wheels. Similarly, each conveyor section is free to move relative to U-shaped members 20 and 22 and relative to bolts 46 which project upwardly through notches 56 in the sides of the conveyor section. Also, and as will best be seen from FIG. 3, the upward divergence of the trailing and leading walls, 18 and 16, of adjacent conveyor sections gives the conveyor the flexibility needed to permit the conveyor to bend around the driving and supporting sprocket wheels which will not be available if walls 16 and 18 of the box like supporting frame were parallel. If desired, a rod can be placed in each loop 60.

Instead of loop 60 and bracket 62, I may use the spring loop 68 of FIG. 7, the lateral arms 70 of which engage the undersides of the conveyor frame, as shown in FIG. 7, it being understood that loop 68 can be used in an inverted position, that is, with the loop disposed below the conveyor sections and with lateral arms 70 thereof engaging the upper sides of the conveyor frame.

It will be noted that each conveyor sections S-1, S-2, is secured to its frame by U-shaped channels 20 and 22; that it is prevented from lateral displacement (in the direction of arrow 14) by bolt 46, and that each frame section is only secured to the sprocket chain by bolts 46.

By this arrangement, a section S-1 and its frame can be removed by merely disengaging bolts 46, and any section S-1, S-2, etc., may be detached from its frame by merely arching the center of the section to withdraw the leading and trailing edges 22 and 24 from U-shaped loops 20 and 22, respectively.

What we claim is:
1. A conveyor including
a number of sections, each having a leading edge,
a trailing edge,
and side edges,
a frame supporting each section, there being a space between the leading edge of each section and the trailing edge of a preceding section,
channels carried by each frame for loosely receiving the leading and trailing edges of the conveyor section carried thereby, there being notches formed near the side edges of each conveyor section,
and studs carried by said frame and freely passing through said notches loosely to engage the sides of said conveyor section.

2. The structure recited in claim 1 and an elongated member articulately engaging the trailing edge of one conveyor section and the leading edge of an adjacent section to overlie the space between any pair of adjacent sections.

3. The structure recited in claim 1 and a bracket carried by the trailing end of the frame of a leading conveyor section and an elongated member carried by the leading end of the frame of a trailing conveyor section and detachably and yieldably engaging said bracket and obstructing the space between each leading and trailing conveyor section.

4. A conveyor for use under conditions of heat fluctuation including:
a plurality of separate frames,
a plurality of separate conveyor sections,
means movably connecting each of said sections to a frame,
sprocket chains rigidly connected to the opposite sides of said frames, and
articulated means carried by said frames and closing the spaces between the trailing edges of a leading section and the leading edge of a trailing section.

5. The structure recited in claim 4 and sprocket chains connected to said frames for propelling said conveyor, at least the leading and trailing portions of each frame converging downwardly to provide an inverted V-space between any pair of adjacent frames to permit the conveyor sections to follow a curved path.

References Cited by the Examiner
UNITED STATES PATENTS 2,584,134  2/52  Knutson _____ 198—195
2,955,702  10/60  Long _____ 198—20 X SAMUEL F. COLEMAN, *Primary Examiner.*
WILLIAM B. LA BORDE, *Examiner.*